(12) United States Patent
Smith et al.

(10) Patent No.: US 12,259,482 B2
(45) Date of Patent: Mar. 25, 2025

(54) TRACKING DEVICE AND SYSTEM

(71) Applicants: Ryan Smith, Ottawa (CA); Salomon Gutierrez, Ottawa (CA)

(72) Inventors: Ryan Smith, Ottawa (CA); Salomon Gutierrez, Ottawa (CA)

( * ) Notice: Subject to any disclaimer, the term of this patent is extended or adjusted under 35 U.S.C. 154(b) by 0 days.

(21) Appl. No.: 17/568,119

(22) Filed: Jan. 4, 2022

(65) Prior Publication Data

US 2022/0221591 A1    Jul. 14, 2022

(51) Int. Cl.

| | |
|---|---|
| *G01S 19/26* | (2010.01) |
| *G01S 19/34* | (2010.01) |
| *G06F 1/16* | (2006.01) |
| *H04W 4/029* | (2018.01) |
| *H04W 4/12* | (2009.01) |
| *H04W 52/02* | (2009.01) |

(52) U.S. Cl.
CPC .............. *G01S 19/26* (2013.01); *G01S 19/34* (2013.01); *G06F 1/163* (2013.01); *H04W 4/029* (2018.02); *H04W 4/12* (2013.01); *H04W 52/0225* (2013.01)

(58) Field of Classification Search
CPC .......... G01S 19/05; G01S 19/34; G01S 19/09; G01S 19/06; G01S 2205/002; G01S 19/01; G01S 2205/006; G01S 11/02; G01S 19/14; G01S 19/13; G01S 5/0009; G01S 19/42; G01S 19/16; G01S 2205/01; G01S 19/26; H04M 11/04; H04W 4/02; H04W 4/021; H04W 4/023; H04W 4/024; H04W 4/025; H04W 4/029; H04W 64/00; H04W 4/80; H04W 4/027; H04W 4/70; G06F 1/163; G04B 37/1486; F41A 17/063; G16H 40/67; G16H 40/63; A01K 27/001; A01K 11/008; A01K 15/021; A61B 2562/222; A61B 5/0245; A61B 5/02438; A61B 2562/0295; A61B 2562/22; A61B 5/681; A61B 5/6831; G08B 21/0286; A63F 13/212
See application file for complete search history.

(56) References Cited

U.S. PATENT DOCUMENTS

| | | | | |
|---|---|---|---|---|
| 5,793,290 | A * | 8/1998 | Eagleson | ........... G08B 13/2454 340/572.1 |
| 8,035,560 | B1 * | 10/2011 | Glodz | .................... G08B 21/22 342/357.71 |
| 10,037,682 | B1 * | 7/2018 | Shah | ................... G08B 21/0272 |
| 10,228,447 | B2 * | 3/2019 | Rich | ..................... A01K 27/009 |
| 10,842,129 | B1 * | 11/2020 | Anderton | .......... H04W 52/0245 |
| 10,893,198 | B1 * | 1/2021 | Zhang | .............. H04N 5/232411 |

(Continued)

FOREIGN PATENT DOCUMENTS

CA          2953547           7/2017

*Primary Examiner* — Olumide Ajibade Akonai
(74) *Attorney, Agent, or Firm* — Frank M. Scutch, III (57) ABSTRACT

A tracking device and system is provided. In one aspect the tracking device comprises more than one type of transceiver; a GPS receiver; a microcontroller which controls the transceivers and GPS receiver; a power source for providing power to the transceivers, GPS receiver and microcontroller; and a secure band for attachment to a wearer. The tracking system includes a tracking device comprising more than one type of transceiver and a GPS receiver; a user device configured to send a wakeup signal to the tracking device; and a communication channel for communication of a function command to the tracking device.

20 Claims, 4 Drawing Sheets

(56) References Cited

U.S. PATENT DOCUMENTS

| | | | |
|---|---|---|---|
| 10,909,840 B1* | 2/2021 | Freathy | G08B 29/046 |
| 11,169,096 B1* | 11/2021 | Segal | G08B 21/22 |
| 2002/0021219 A1* | 2/2002 | Edwards | G08B 21/023 |
| | | | 340/573.1 |
| 2003/0182055 A1* | 9/2003 | Curatolo | G08B 25/016 |
| | | | 701/468 |
| 2005/0136912 A1* | 6/2005 | Curatolo | G01S 5/0036 |
| | | | 455/423 |
| 2010/0069087 A1* | 3/2010 | Chow | G08B 21/0269 |
| | | | 340/8.1 |
| 2012/0179067 A1* | 7/2012 | Wekell | A61B 5/6831 |
| | | | 600/587 |
| 2017/0039833 A1* | 2/2017 | Baczuk | E05B 73/00 |
| 2017/0215033 A1* | 7/2017 | Piraino | H04W 4/029 |
| 2018/0012472 A1* | 1/2018 | Purcell | G08B 21/023 |
| 2018/0026678 A1* | 1/2018 | Biederman | H04B 5/0037 |
| | | | 455/41.1 |
| 2020/0037904 A1* | 2/2020 | Tegen | A61B 5/746 |
| 2020/0107522 A1* | 4/2020 | Kersey | G08B 21/0261 |
| 2020/0250953 A1* | 8/2020 | Wojcik | G08B 21/22 |
| 2022/0157143 A1* | 5/2022 | Panneer Selvam | G04G 9/007 |

* cited by examiner

TRACKING DEVICE AND SYSTEM

TECHNICAL FIELD

The present invention relates to a device for tracking missing persons.

BACKGROUND

Recently, there has been a significant increase in the development of smart and open-sourced products, known as The Internet of Things (IoT). IoT describes networks of physical objects ("things") that are embedded with sensors, software, and other technologies for the purpose of connecting and exchanging data with other devices and systems, over the Internet.

Wearable tracking technology is utilized in many industries, such as healthcare, agricultural, natural resources, heavy industry and recreation fields, in order to monitor various items, such as a person, animal or thing's location, heart rate, speed of travel and estimated energy expenditure. The field of wearable tracking devices involves a considerable amount of technologies, ranging from wearable-disposable RF bracelets to wearable-smart watches that utilize tracking technology and are, in essence, cellular devices that can make phone calls. Other accessory devices examples include wearable-insoles for shoes, pendants, jewelry, coins and wearable devices that are stitched in clothing.

According to the Alzheimer's Society of Ontario, up to 60 percent of people with dementia-related memory problems go missing at some point. Half of the people with dementia, who go missing for at least 12 hours, end up seriously injured or deceased according to a Globe and Mail Article published in November 2018 that referenced the Alzheimer Society of Canada. Currently there are 564,000 Canadians living with dementia, including Alzheimer's. According to the Government of Canada website, there are approximately 76,000 new cases diagnosed annually. By 2031, 937,000 Canadians will have dementia (Paula McCooey, Ottawa Citizen, May 25, 2017—"How to Protect Loved Ones Living With Dementia").

According to survey data published in the Journal of Pediatrics, nearly half of families with autistic children reported their children with autism wandered or escaped from safe environments. Children with autism go missing under a variety of circumstances, such as searching for small or enclosed spaces, looking for places of special interest to them or in an attempt to escape overwhelming stimuli such as sights, sounds, surroundings or activities of others (Autism & Wandering; https://www.missingkids.org/theissues/autism).

In the field of mental health, the term 'absconding' refers to an occurrence where a person in care cannot be located within the treatment unit and that person's whereabouts are unknown. Absconding can take place in many different care settings and is a major safety issue for people with mental illness because of the potential of increased risk or harm to self or others when an individual leaves the care environment (Mental Health Care: Absconding and Missing Patients; https://www.patientsafetyinstitute.ca/en/education/PatientSafetyEducationProgram/Pat ientSafetyEducation-Curriculum/MentalHealthModules/Pages/Mental-Health-Care-Absconding-and-Missing-Patients.aspx).

Typically, when a person is missing, tracking technology is used in an attempt to find the person. If tracking technology is not used, the time for finding a missing person increases exponentially. In one example, the "Project Lifesaver" organization, established in April 1999 in the US, employs RF technology to locate individuals with cognitive disorders who are prone to the life threatening behaviour of wandering. According to their website (projectlifesaver.org), recovery of a person generally occurs within 30 minutes, which is 95% less time than standard search operations without the use of the technology.

Other types of trackers use 4G wearable-GPS trackers. An example of such a device is called "AngelSense", which attaches to a person's clothing and can only be removed by the caregiver. The device provides daily tracking of location, routes, and transit speeds. Caregivers can determine the present location, actively or passively communicate with the tracked person, and send alarms.

There are several other example trackers available. GPS Shoes and insoles are another manner of tracking a person and allowing a caregiver to track using a smartphone, tablet or browser. As another example, "iTraq" sends an alert in the event a fall is detected. In a further example, Medic Alert Home Safety includes the use of a bracelet that acts as a tracking device with which a caregiver can call a 24 hour hotline to find the location of the missing person. Important medical information is also engraved upon the bracelet itself. In yet another example, a tracking device called "Mindme" takes the form of a pendant that can either be worn or put into a pocket, backpack, purse or bag, and allows the caregiver to track the user online.

There are several limitations and drawbacks with existing trackers. While devices that utilize RF technology have a generous battery life, often lasting 3 months and beyond, such devices have a diminished level of accuracy in pinpointing the area of the missing person. RF technology also requires specific equipment to be readily available for searching for a subject. Other shortcomings involve a high level of human resources and participation required to locate a missing person due to the low level of accuracy of the RF technology, as well as further human intervention for maintenance of the system, such as battery replacements and functionality testing.

Conversely, devices that utilize solely GPS technology have a diminished battery life, the majority of which require re-charging every 1-4 days. Non-published case studies have revealed that missing persons have been located (whether alive or deceased) with tracking devices that have a dead battery, rendering them useless.

Existing tracking devices have non-permanent methods of attachment, and barring a tracking implant and the ethical considerations associated, no suitable attachment device has been designed. The majority of the devices marketed are meant for a compliant and co-operative wearer. Devices in the form of pendants or designs meant to be carried in a pocket, or bag, on persons, require a higher level of cognitive functioning. Additionally, some semblance of cognitive function is still required for embedded devices in footwear, or clothing such as jackets, or other forms of outerwear. An unfortunate, yet realistic, occurrence is that of a missing person being inappropriately dressed—lacking footwear, or clothing necessary for weather conditions. Due to the lower cognitive function, the wearer can inadvertently leave the tracking device behind when they leave the house or residence. There are many documented cases in which a missing person that was located alive or deceased was not dressed for the weather or was found to have one or no shoes on.

Some devices utilize either a nylon or leather bracelet with a plastic "snap set" to close the band and secure it to the wearer; however, any non-compliant or uncooperative wearer could easily remove the band with common and readily available household items. Another reason for the reluctance of people to wear a tracking device, in the form of a bracelet or other form, relates to the stigma associated by the wearer with aging, memory loss, and the decline of mental faculties. According to the Alzheimer Society of Canada, 46% of Canadians admitted that they would be embarrassed if they were diagnosed with any form of dementia.

Finally, most current devices, apart from those utilizing RF frequencies, are predicated on the assumption that cellular and GPS technology is available at the time and location the person goes missing. Should the wearer not be within cellular range, or subject to solar flare/interference, it would be impossible to transmit a signal to a network. Further, in densely packed areas such as downtown or urban areas, simple RF signals can be interrupted due to other radio frequencies and large objects such as buildings. This would make locating a wearer, through signal strength, inaccurate or even ineffective.

SUMMARY

The present invention relates to the field of wearable tracking devices for obtaining a person's geographic position through the use one or more of the following;
- Global Navigation Satellite Systems (GNSS) (i.e., the USA's GPS (Global Positioning Systems), Europe's Galileo, Russia's GLONASS (Global Navigation Satellite System), China's BDS (BeiDou Navigation Satellite System) and India's NacIC (Navigation with Indian Constellation));
- Passive Wi-Fi scanning;
- Cellular Tower identifier; and
- RF (Radio Frequency) Trackers.

The present invention introduces redundancies in order to increase effectiveness, providing additional layers of safety for the wearer and mitigating problems associated with known technologies. The novel combination of parts in one example involves a merging of RF with GPS and cellular technology. Implementation and utilization of Low-Power Long-Range (LoRa) radio frequencies through Long-Range Wide-Area Networks (LoRaWAN) provides an overlapping of locating technology to locate missing persons where no cellular and/or GPS signal is present.

In one aspect, the device, along with software, is designed to locate vulnerable people that have gone missing, through the method of geo-locatable wearable devices combined with applications or web portals to remotely monitor and/or connect with those wearables.

In a further example aspect, the device is designed to be securely fastened by a band with a locking mechanism that is affixed to an extremity (e.g. the wrist or ankle) of the wearer. In one example, the band is engineered for durability and security and is composed of metals, high strength plastics, hypoallergenic rubberized materials, and/or a combination of those and other synthetic or organic materials.

In one aspect there is provided a tracking device comprising more than one type of transceiver; a GPS receiver; a microcontroller which controls the transceivers and GPS receiver; a power source for providing power to the transceivers, GPS receiver and microcontroller; and a secure band for attachment to a wearer.

In another aspect, there is provided a tracking device wherein the microcontroller controls the hibernation of the transceivers in order to prolong a charge of the power source.

In a further aspect, there is provided a tracking device wherein the more than one type of transceiver is selected from the group consisting of RF, cellular, Wi-Fi and Bluetooth.

In a further aspect, upon receipt of an external signal containing a function command, the microcontroller performs a function.

In a further aspect, the function commands are selected from the group consisting of wakeup, collect data, transmit data, and return to a state of dormancy.

In a further aspect, upon receipt of the external signal containing the function command for wakeup, the microcontroller receives a location from the GPS receiver and causes one or more of the transceivers to transmit the location.

In a further aspect, there is provided a tracking device wherein the secure band has a conductive strip. In a further aspect, the conductive strip is provided internally throughout the length of the band. In a further aspect, the microcontroller is connected to the conductive strip and is configured to send an alert signal if the conductive strip is broken.

In a further aspect, the alert signal is sent on all transceivers. In a further aspect, the secure band is secured through a lockable pin.

In a further aspect, there is provided a tracking device further comprising an aesthetic covering. In a further aspect, the aesthetic covering is a timepiece, bracelet or jewelry.

In a further aspect, there is provided a tracking device further comprising an exterior made from rubber or an aesthetically soft material.

In a further aspect, there is provided a tracking system comprising: a tracking device comprising more than one type of transceiver and a GPS receiver; a user device configured to send a wakeup signal to the tracking device; and a communication channel for communication of a function command to the tracking device.

In a further aspect, the communication channel is selected from the group consisting of RF, cellular, Wi-Fi and Bluetooth.

In a further aspect, upon receipt of the function command containing a wakeup signal from the user device through the communication channel, the tracking device is configured to receive a location from the GPS receiver and cause one of the transceivers to transmit the location through the communication channel to the user device.

In a further aspect, there is provided a tracking system further comprising a gateway for extension of the communication channel through an RF signal. In a further aspect, the gateway is provided on a drone, a vehicle or a building.

In a further aspect, there is provided a tracking system further comprising a server for intermediary receipt of the location and interpretation of the location into a form that is user-friendly for provision to the user device.

BRIEF DESCRIPTION OF THE DRAWINGS

The invention will be further understood from the following description with reference to the attached drawings.

DETAILED DESCRIPTION

A preferred embodiment of the present invention will be set forth in detail with reference to the drawings, in which like reference numerals refer to like elements or method steps throughout.

In one example embodiment, the present invention sets forth a device that uses a network of wireless connections in order to minimize search personnel. The device is a geo-locating wearable with improved capabilities in both reliability and accuracy and has multiple points of network connectivity and failsafes. Through the deployment of an IoT protocol and cloud network servers, along with the use of "Gateways", the geolocation of the wearer can be obtained.

Figure 1:
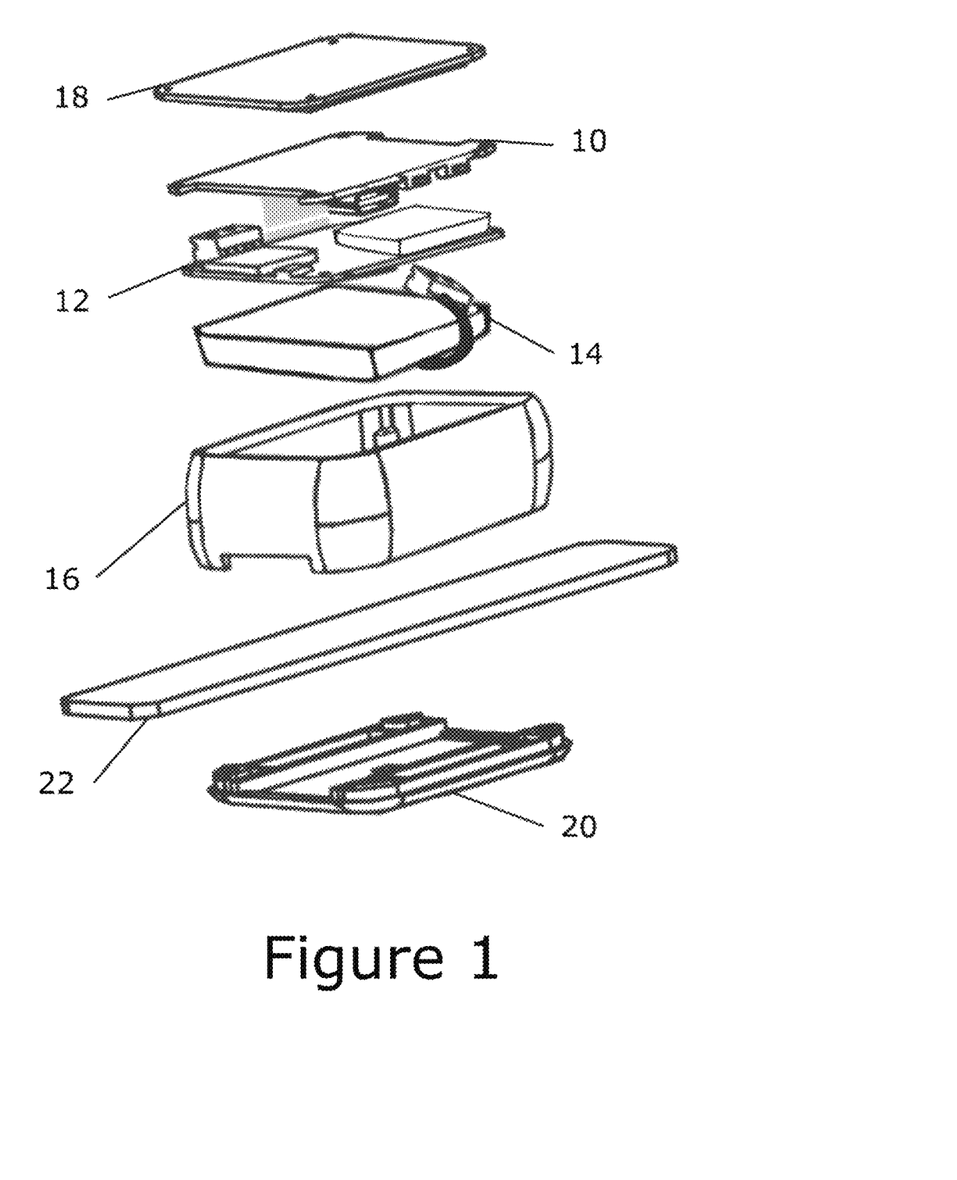
FIG. 1 illustrates an exploded view of one example embodiment of the tracking device of the present invention.

FIG. 1 shows an exploded view of one example embodiment of the tracking device of the present invention. Printed circuit boards (PCB) are used to control the device and to house the various transceivers and one or more microcontrollers. In the example of FIG. 1, two PCBs are provided, namely a core PCB 10 and a Module PCB 12. A battery or power source 14 is included to power the components. The device sits within a shell 16 enclosed with a top 18 and bottom 20, sandwiched next to the watchband 22. The arrangement of components can change as well as the size. For example, the device can be slim and/or formed within the watchband.

In an example embodiment, the enclosure of the shell 16 is achieved by shared mating surfaces with the top 18, which are fastened shut and sealed with one or more rubberized gaskets, which could provide all-weather capabilities such as resistance to water or water-proofing. The body of the shell 16 houses and protects electronic circuitries, including microcontroller(s), module(s), and power source.

In a further example embodiment, the device includes a programmed microcontroller to monitor the circuitry and power management. The microcontroller keeps the components in a state of hibernation until it receives a function command. Sample function commands include commands to wake up, collect data, transmit data, and/or return to a state of dormancy. In order to reduce the power usage, the device preferably spends the majority of time in a state of hibernation, which is an existing function of the technology.

The microcontroller is optionally programmed in order to select which components stay in hibernation at what time. For example, upon receipt of a signal containing a function command, the microcontroller will determine, based on the nature of the received signal, whether to respond using Bluetooth™, passive Wi-Fi, cellular or RF (Radio Frequency). The microcontroller can be programmed to respond via the same communication as the received signal and/or to receive a signal containing function command requiring the device to communicate over a requested communication channel.

During one form of example operation, when the device is awakened, it can send GPS coordinates through a wireless connection to a network, which is then processed in a server solution or other typical application. The GPS coordinates could consist of a small amount of raw data, such as latitude and longitude points or MGRS points. This method of relaying the wearer's location is ideal for areas where cellular coverage is not available, yet GPS/GNSS satellites are.

During a second form of example operation, if neither cellular or GPS connection can be obtained the device will still transmit a radio signal (RF) such as the kind used to send and receive data between transceivers. The radio transmission can be done simultaneously with cellular and/or GPS connection or as an alternative thereto. The strength of the received transmission can be optionally used to indicate the distance as well as the direction of the wearer. The radio signal source can be triangulated or used to follow its strength, using a gateway as a receiver to locate the wearer. An example form of a gateway could be affixed and permanent to a fixed structure, or mobile, such as in vehicles or carried by drones. One advantage of using a drone is to extend the line of sight beyond that available on the ground due to obstructions, exponentially increasing it's connection range.

Figure 2:
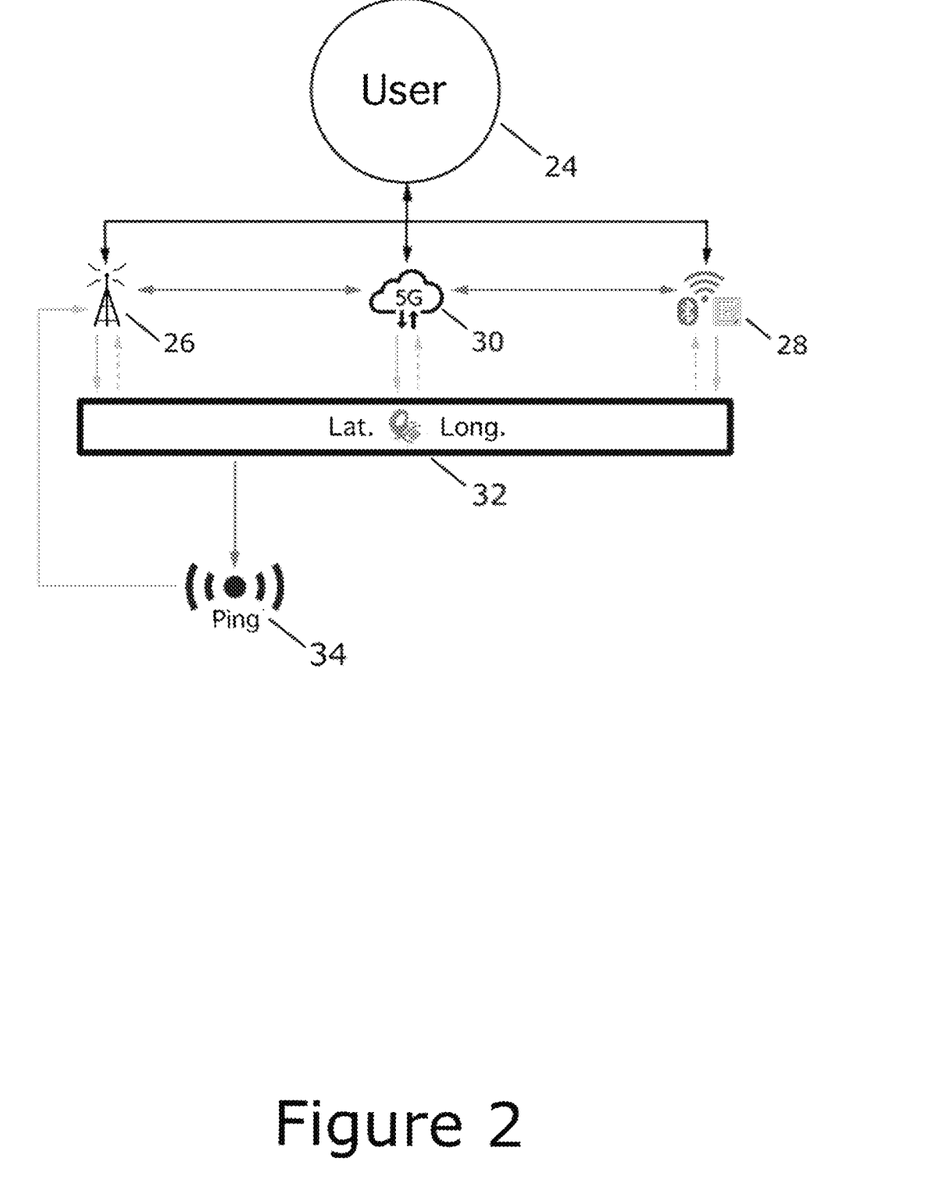
FIG. 2 illustrates an example tracking system.

FIG. 2 shows an example tracking system in accordance with one aspect of the present invention. A user 24 is attempting to locate the wearer of the tracking device who needs to be found. The three modes of communication are represented in FIG. 2 as RF 26; Bluetooth™, Wi-Fi, NFC 28; and 5G cellular 30. GPS/GNSS 32 is shown as providing the latitude and longitude location of the wearer. When a communication is received by any of the communication channels, the device replies with the location of the wearer, for example by providing the latitude and longitude. If a communication cannot be achieved by any of the three modes of communication, the device will default to a basic pulse mode, using a radio frequency ping 34, with or without location information.

Figure 3:
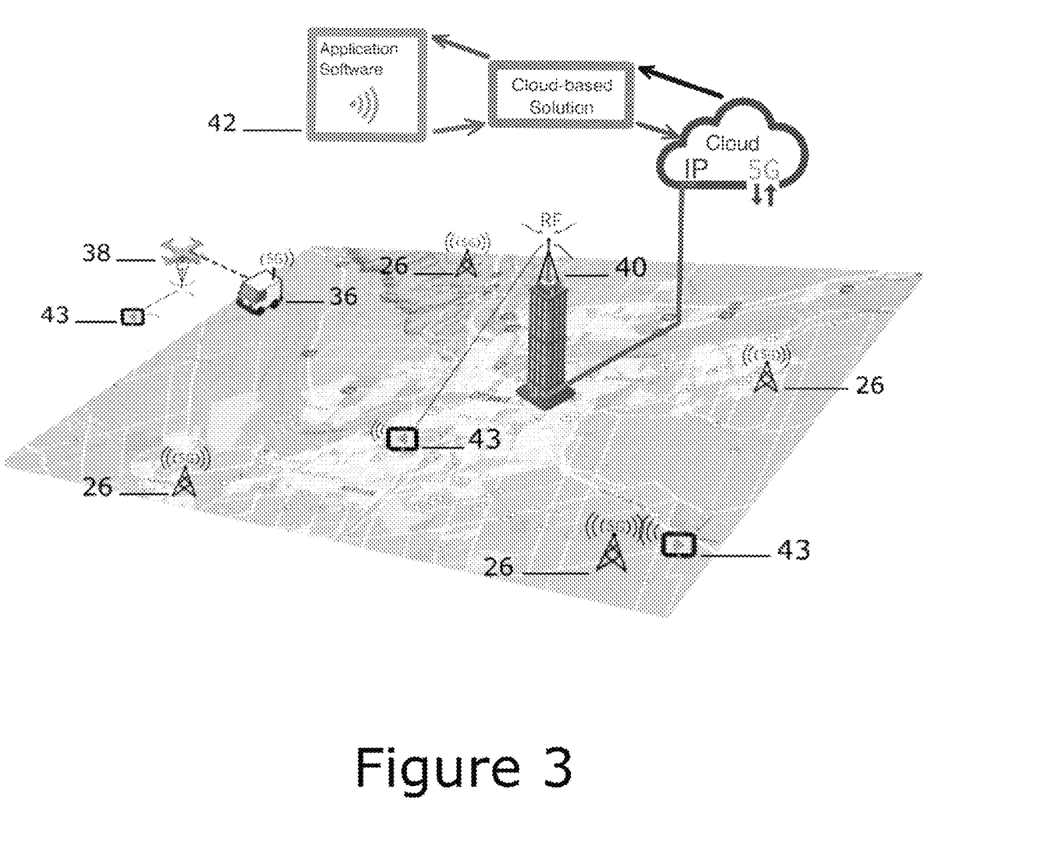
FIG. 3 illustrates the use of the tracking system with various types of communication systems.

FIG. 3 illustrates the use of the tracking system with various types of communication systems. A mobile gateway can be provided via a vehicle 36 or via a drone 38. If the wearer of the tracking device 43 is in a remote location away from road access, or cellular, Bluetooth or Wi-Fi communication, a mobile gateway can be used. For example, a drone 38 can be controlled via a vehicle 36 to fly over remote areas and transceive a ping or wakeup signal via RF transmission. Alternatively, if there are roads, the vehicle 36 itself can transmit a ping or wakeup signal via RF transmission while driving through the area. Other forms of communication shown include cellular 26 from cellular towers and RF 40 transmission from transceivers mounted on surrounding buildings. The application software 42 resides on a server or on the caregiver computing device so that the tracking device 43 is free from complicated software. The wakeup signal or ping is communicated through the appropriate channel (e.g. cellular, RF, Wi-Fi, Bluetooth, NFC) and the location is received by the application software 42 from the tracking device 43. The application software 42 then converts the raw data received from the tracking device 43 into a user-friendly format, e.g. by providing the user with a map or written directions pertaining to the location of the wearer. In this context, the user or caregiver is the person initiating the tracking request, while the wearer is the person wearing the tracking device 43.

In order to ensure that the wearer is wearing the device, the device can be optionally securely fastened by a band with a locking mechanism that is affixed to an extremity (e.g. the wrist or ankle) of the wearer.

In a further example embodiment, the band is designed to be cut, tear, and tamper resistant. The band is composed of high strength materials, surrounded by pliable materials, to promote both safety and comfort to the wearer. In one example, the locking mechanism is composed of one or more metals, utilizing a threaded and/or magnetic-fastened closure, which joins the open ends of the band creating a closed and locked loop. The locking mechanism of the bracelet or band in one example optionally includes a tool or device specialized for removal of the band.

The closure of the bracelet or band is optionally also a physical part of an integrated circuit that is monitored by the device. Should the band be cut or removed, for any reason other than a planned event, the device will detect this and send a notification, via wireless connection, indicating that the band has been removed. The band contains the device, thus removal of the band effectively results in removal and/or disconnection of the device from the person to be tracked.

Detection of the removal of the band and device can occur through a variety of ways. In the preferred embodiment, a strap is provided with an electric circuit which is closed upon closure of the locking mechanism. In this embodiment, breakage of the closed circuit will be detected by the microprocessor, which is programmed to send the notification in the preferred manner. Any such notification can be sent through any of the communication methods available, such as RF, cellular, WIFI, etc. The notification can be sent to a caregiver for receipt, for example, via email, text message, or any other form of audio or visual signal to alert the caregiver to the removal of the band containing the device. Any such notification can optionally include a last known location of the person wearing the device.

Figure 4:
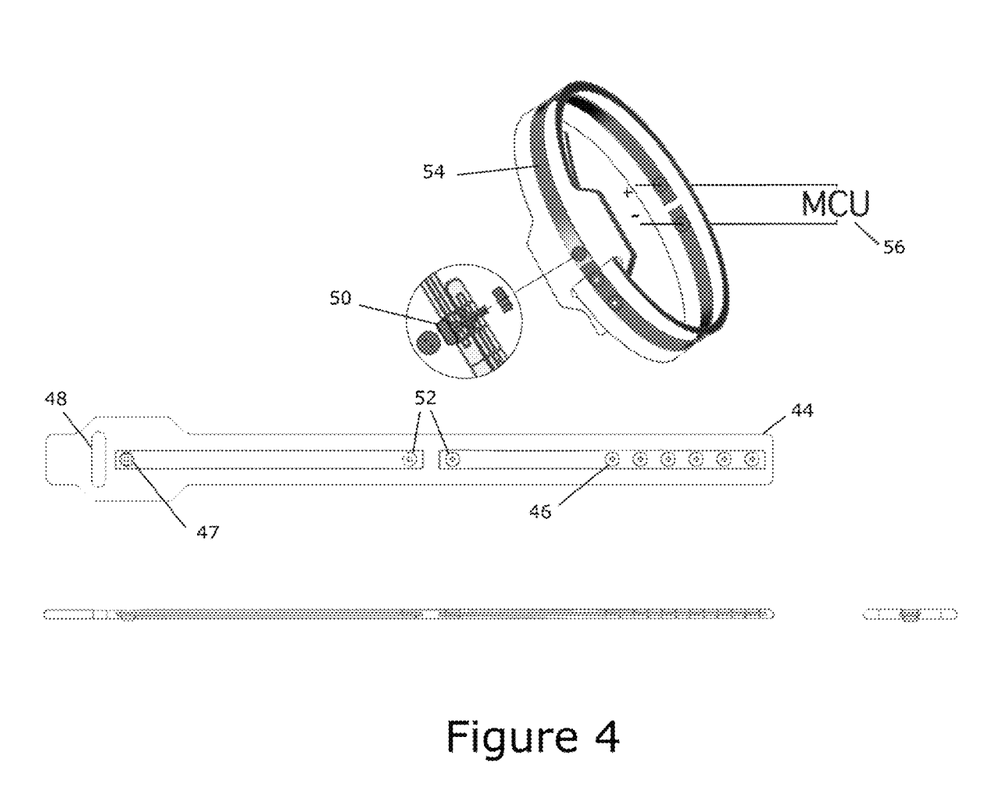
FIG. 4 illustrates an example embodiment of a band or strap for the tracking device.

FIG. 4 shows an example embodiment of the band for the device. One end of the band 44 contains holes 46 which permit various sizes of attachment. The other end of the band 44 contains a hole 47 and slot 48. The first end of the band slides into the slot 48 and a lockable pin 50 is inserted into the hole 47 and lines up with the appropriate hole from the holes 46 in the first end of the band 44. A tool can optionally be used to insert and remove the pin 50. The band contains two additional mounting holes 52 for mounting the tracking device externally to the band 44. The center of the band contains a strip 54 of conductive material. The two additional mounting holes 52 go through the strip 54 of conductive material such that when the tracking device is mounted on the band 44, conductive pins, from the tracking device MCU 56, are inserted through the mounting holes 52 to create a closed circuit. If the strip 54 of conductive material is severed in any way, or if the tracking device is removed, the circuit will be broken and the tracking device will detect the broken circuit. As an alternative, the tracking device can be formed within the band 44 rather than mounted externally, in which case the tracking device will be connected to the strip 44 within the band. The exterior of the band can be provided with a rubber or aesthetically soft covering material or casing, encasing the strip 44 and optionally the tracking device within.

The battery life of the wearable device is extended due to the hibernation capability and use of low-power technologies. The simplicity of the arrangement ensures that the device does not burn excess energy, thereby conserving battery life. The microcontroller is optionally programmed to assess battery levels, in order to prioritize and select which components are utilized. Furthermore, the device purposefully does not include any fancy technological features, such as a display or extraneous sensors, in order to further preserve battery life.

An optional aesthetic covering is included, which could be functional, such as a timepiece, or decorative, such as a bracelet or piece of jewelry. Such an aesthetic covering could assist a user with any perceived stigma of wearing a tracking device, thereby increasing the probability of adherence as well as acceptance of wearing the device, without the wearer having the angst associated with self-consciousness. Furthermore, if the aesthetic covering is a timepiece, or a component requiring a battery, the timepiece or component or aesthetic covering will include a separate battery so as not to draw on the battery life of the tracking device.

Following from the above description, it should be apparent to those of ordinary skill in the art that, while the methods and apparatuses herein described constitute exemplary embodiments of the present invention, the invention described herein is not limited to any precise embodiment and that changes may be made to such embodiments without departing from the scope of the invention as defined by the claims. For example, while reference has been made to a battery throughout the application, it will be appreciated that the battery could be any suitable power source.

The scope of the claims should not be limited by the preferred embodiments set forth in the examples but should be given the broadest interpretation consistent with the description as a whole. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A tracking device comprising:
a secure lockable continuous band for encircling an extremity of a wearer, wherein the band has a conductive strip throughout the length of the band;
an RF transceiver;
a cellular transceiver;
a GPS receiver;
a microcontroller which controls the RF and cellular transceivers and GPS receiver; and
a power source for providing power to the RF and cellular transceivers, GPS receiver and microcontroller;
wherein the band extends through the entire interior of the housing;
wherein the RF and cellular transceivers and the GPS receiver are configured to be in hibernation mode;
wherein the microcontroller is configured to awaken one or more of the RF and cellular transceivers and the GPS receiver from hibernation upon receipt of a first signal over an external RF or cellular communication channel;
wherein the microcontroller is configured to transmit a second signal indicating location coordinates using the RF and/or cellular transceivers over the external RF and/or cellular communication channel; and
wherein the microcontroller comprises one or more conductive pins which fit through one or more matching holes in the conductive strip of the band in the interior of the housing to provide an electrical connection between the microcontroller and the conductive strip.

2. The tracking device of claim 1, wherein the microcontroller controls the hibernation of the transceivers in order to prolong a charge of the power source.

3. The tracking device of claim 1, further comprising a Wi-Fi, Bluetooth and/or NFC transceiver consisting of RF, cellular, Wi-Fi and Bluetooth wherein the Wi-Fi, Bluetooth and/or NFC transceiver is configured to be in the hibernation mode;
wherein the microcontroller is configured to awaken the Wi-Fi, Bluetooth and/or NFC transceiver from hibernation upon receipt of the first signal over the external RF or cellular communication channel or over an external Wi-Fi, Bluetooth and/or NFC communication channel; and wherein the microcontroller is configured to transmit the second signal using the RF, cellular, Wi-Fi, Bluetooth and/or NFC transceiver over the external RF, cellular, Wi-Fi, Bluetooth and/or NFC communication channel.

4. The tracking device of claim 3, wherein the location coordinates are determined by the GPS receiver, by the strength of the second signal over the external RF communication channel, or by triangulation of the second signal over the external RF communication channel.

5. The tracking device of claim 4, wherein the first signal includes function commands for controlling the microprocessor selected from the group consisting of wakeup, collect data, transmit data, and return to a state of dormancy.

6. The tracking device of claim 5, wherein upon receipt of the first signal containing the function command for wakeup, the microcontroller receives a location from the GPS receiver and causes one or more of the transceivers to transmit the location.

7. The tracking device of claim 3, wherein the microcontroller is configured to send a ping using the RF transceiver over the external RF communication channel in a basic pulse mode if the second signal cannot be transmitted.

8. The tracking device of claim 1, wherein the secure band further comprises a conductive strip internally throughout the length of the band.

9. The tracking device of claim 8, wherein the microcontroller is connected to the conductive strip and is configured to send an alert signal if the conductive strip is broken.

10. The tracking device of claim 9, wherein the alert signal is sent on all transceivers.

11. The tracking device of claim 8, wherein the secure band is secured through a lockable pin.

12. The tracking device of claim 11:
wherein the secure band comprises a slot near one end configured to receive the other end of the secure band therein; and
wherein the lockable pin fits in matching holes in each end of the secure band to lock the secure band in place.

13. The tracking device of claim 1, further comprising an exterior made from rubber or an aesthetically soft material.

14. A tracking system comprising:
a tracking device comprising a secure lockable continuous band for encircling an extremity of a wearer and comprising:
a housing comprising an RF transceiver, a cellular transceiver, and a GPS receiver, wherein the band extends through the entire interior of the housing;
a user device configured to send a first signal over an external RF or cellular communication channel to the tracking device;
wherein the tracking device is configured to be in hibernation mode;
wherein the tracking device is configured to awaken from the hibernation mode upon receipt of the first signal;
wherein the tracking device is configured to transmit a second signal indicating location coordinates using the RF and/or cellular transceivers over the external RF and/or cellular communication channel to the user device; and wherein the housing further comprises a microcontroller which comprises one or more conductive pins which fit through one or more matching holes in a conductive strip of the band in the interior of the housing to provide an electrical connection between the microcontroller and the conductive strip.

15. The tracking system of claim 14, wherein the tracking device further comprises a Wi-Fi, Bluetooth and/or NFC transceiver;
wherein the first signal is sent over an external Wi-Fi, Bluetooth and/or NFC communication channel;
wherein the tracking device is configured to transmit the second signal using the RF, cellular, Wi-Fi, Bluetooth and/or NFC transceiver over the external RF, cellular, Wi-Fi, Bluetooth and/or NFC communication channel to the user device.

16. The tracking system of claim 15, wherein the second signal contains data from the GPS receiver, or an RF signal; and wherein the user device converts the second signal into a user-friendly form by the data from the GPS receiver, by the strength of the second signal over the external RF communication channel, or by triangulation of the second signal over the external RF communication channel.

17. The tracking system of claim 16, further comprising a gateway for extension of the external RF communication channel through an RF signal.

18. The tracking system of claim 17, wherein the gateway is provided on a drone, a vehicle or a building.

19. The tracking system of claim 15, further comprising a server for intermediary receipt of the second signal and interpretation of the location coordinates into a form that is user-friendly for provision to the user device.

20. A tracking device comprising:
a secure lockable continuous band for encircling an extremity of a wearer, wherein the band has a conductive strip throughout the length of the band;
an RF transceiver;
a cellular transceiver;
a GPS receiver;
a microcontroller which controls the RF and cellular transceivers and GPS receiver; and
a power source for providing power to the RF and cellular transceivers, GPS receiver and microcontroller;
wherein the RF and cellular transceivers and the GPS receiver are configured to be in hibernation mode;
wherein the microcontroller is configured to awaken one or more of the RF and cellular transceivers and the GPS receiver from hibernation upon receipt of a first signal over an external RF or cellular communication channel;
wherein the microcontroller is configured to transmit a second signal indicating location coordinates using the RF and/or cellular transceivers over the external RF and/or cellular communication channel; and
wherein the microcontroller comprises one or more conductive pins which fit through one or more matching holes in the conductive strip of the band to provide an electrical connection between the microcontroller and the conductive strip.

* * * * *

UNITED STATES PATENT AND TRADEMARK OFFICE
CERTIFICATE OF CORRECTION

| | | |
|---|---|---|
| PATENT NO. | : 12,259,482 B2 | Page 1 of 1 |
| APPLICATION NO. | : 17/568119 | |
| DATED | : March 25, 2025 | |
| INVENTOR(S) | : Ryan Smith et al. | |

It is certified that error appears in the above-identified patent and that said Letters Patent is hereby corrected as shown below:

On the Title Page

Insert Item (30) Foreign Application Priority Data:
--January 13, 2021 (CA) ............................ 3105572--

Signed and Sealed this
Fifteenth Day of July, 2025

Coke Morgan Stewart
*Acting Director of the United States Patent and Trademark Office*